United States Patent
Renz et al.

(10) Patent No.: US 10,569,205 B2
(45) Date of Patent: Feb. 25, 2020

(54) FINAL SEPARATOR

(71) Applicant: Mahle International GmbH, Stuttgart (DE)

(72) Inventors: Birgit Renz, Marbach (DE); Peter Koppi, Sankt Margarethen (AT); Mathias Kollmann, Maria Elend (AT); Julia Santer, Voelkermarxt (AT)

(73) Assignee: Mahle International GmbH (DE)

( * ) Notice: Subject to any disclaimer, the term of this patent is extended or adjusted under 35 U.S.C. 154(b) by 283 days.

(21) Appl. No.: 15/506,471

(22) PCT Filed: Aug. 26, 2015

(86) PCT No.: PCT/EP2015/069479
§ 371 (c)(1),
(2) Date: Feb. 24, 2017

(87) PCT Pub. No.: WO2016/030398
PCT Pub. Date: Mar. 3, 2016

(65) Prior Publication Data
US 2017/0252686 A1    Sep. 7, 2017

(30) Foreign Application Priority Data
Aug. 26, 2014    (DE) .......... 10 2014 216 979

(51) Int. Cl.
*B01D 63/00* (2006.01)
*B01D 39/18* (2006.01)
(Continued)

(52) U.S. Cl.
CPC .......... *B01D 39/18* (2013.01); *B01D 5/0012* (2013.01); *B01D 29/012* (2013.01);
(Continued)

(58) Field of Classification Search
CPC ...... B01D 63/00; B01D 63/08; B01D 63/081; B01D 69/00; B01D 69/06; B01D 69/14;
(Continued)

(56) References Cited

U.S. PATENT DOCUMENTS

| | | | |
|---|---|---|---|
| 9,138,669 B2 | 9/2015 | Leung et al. | |
| 9,199,185 B2 | 12/2015 | Verdegan et al. | |
| 2007/0074628 A1 | 4/2007 | Jones et al. | |
| 2012/0061314 A1* | 3/2012 | Choi | B01D 67/0088 210/490 |

FOREIGN PATENT DOCUMENTS

| | | |
|---|---|---|
| DE | 112010001912 T5 | 6/2012 |
| DE | 112010002027 T5 | 8/2012 |

(Continued)

OTHER PUBLICATIONS

English abstract for DE-112011102095.
Search Report for DE-102014216979.8 dated Dec. 1, 2014.

*Primary Examiner* — Allison G Fitzsimmons
(74) *Attorney, Agent, or Firm* — Fishman Stewart PLLC

(57) ABSTRACT

A separator for a separator device, for example a final separator for a final separator device for separating water from a liquid such as oil and/or fuel, may include a filter body including at least one filter material through which the liquid can flow. The filter body may have a first side and a second side. A nanofibre layer may be disposed on the first side in at least one region. The nanofibre layer may be configured hydrophobic. According to an implementation, the nanofibre layer is treated to produce the hydrophobic property. The filter body may have a porosity on the first side that is smaller than on the second side.

18 Claims, 3 Drawing Sheets

(51) Int. Cl.
*F02M 37/24* (2019.01)
*B01D 39/16* (2006.01)
*B01D 5/00* (2006.01)
*B01D 29/01* (2006.01)
*B01D 35/00* (2006.01)
*B01D 39/20* (2006.01)
*F01M 11/03* (2006.01)
*F01M 13/04* (2006.01)
*B01D 69/00* (2006.01)

(52) U.S. Cl.
CPC ......... *B01D 29/016* (2013.01); *B01D 35/005* (2013.01); *B01D 39/1623* (2013.01); *B01D 39/2017* (2013.01); *F01M 11/03* (2013.01); *F01M 13/04* (2013.01); *F02M 37/24* (2019.01); *B01D 2239/025* (2013.01); *B01D 2239/0428* (2013.01); *B01D 2239/065* (2013.01); *B01D 2239/10* (2013.01); *B01D 2239/1208* (2013.01); *B01D 2239/1216* (2013.01); *F01M 2013/0477* (2013.01)

(58) Field of Classification Search
CPC ...... B01D 69/141; B01D 71/00; B01D 71/02; B01D 71/024; B01D 71/028; B01D 71/025; B01D 71/027; B01D 2325/00; B01D 2325/02
USPC .......... 210/500.1, 500.21, 510.1; 264/41, 42, 264/43, 44, 45.1, 45.2, 46.4, 603, 628, 264/629, 630, 651, 652, 653, 654, 112, 264/113; 442/56; 428/43, 116, 118, 220
See application file for complete search history.

(56) References Cited

FOREIGN PATENT DOCUMENTS

| | | |
|---|---|---|
| DE | 112011102095 T5 | 7/2013 |
| EP | 1954373 B1 | 4/2011 |
| WO | WO-2009018463 A2 | 2/2009 |
| WO | WO-2014037205 A1 | 3/2014 |

* cited by examiner

FINAL SEPARATOR

CROSS REFERENCE TO RELATED APPLICATION

This application claims priority to German Patent Application No. 10 2014 216 979.8 filed on Aug. 26, 2014, and International Patent Application No. PCT/EP2015/069479 filed on Aug. 26, 2015, the contents of which are hereby incorporated by reference in their entirety.

TECHNICAL FIELD

The present invention relates to a final separator for a final separator device comprising a filter body through which a fluid can flow from which water is to be separated. The invention additionally relates to a final separator device which is fitted with at least one such final separator.

BACKGROUND

Filter devices are used in numerous applications in order to purify various fluids from solid and/or liquid contaminants entrained therein. If water is to be separated from a liquid which is different from water, final separator devices are used. This functions primarily when the water is present with the respective other liquid as dispersion. In this case, the water is usually distributed in the other liquid in the form of very small droplets so that the water is present as a disperse phase whilst the other liquid forms a dispersion medium.

Accordingly, a final separator device in the present context is a filter device which is at least suitable for separating water from another liquid.

Very frequently such separator devices are combined with a coalescing filter device. In particular, a final separator through which the fluid can flow, which is suitable for separating water from the respective fluid, can at the same time act as a filter. In particular vehicle applications are of particular interest in this case. For this purpose such a final separator and/or filter device usually comprises a filter element through which the respective fluid can flow and thereby filters the fluid or separates from contaminants, dirt particles and the like and at the same time optionally brings about a separation from water. Such a filter element can be used for purifying a liquid, in particular from oil or fuel. The final separator here comprises a filter body through which the respective fluid can flow which, as a result of its structural formation or physical and/or chemical properties allows the separation of water from the fluid and in particular the filtering of the fluid. The filter body can be formed from at least one filter material through which flow can take place or at least one such filter material which in particular has said structural, physical and/or chemical properties. In addition, it is fundamentally conceivable to provide the filter body or the filter material with pores or select a filter body having pores, in order to thereby enable a flow of fluid through the filter body and thereby separate water and optionally screen or filter contaminants or dirt particles from the fluid.

SUMMARY

The present invention is concerned with the problem of providing an improved or at least different embodiment for a final separator of the type mentioned initially, which is characterized by an efficient separating effect for water. In addition, a cost-effective production should be ensured.

The said problem is solved according to the invention by the subject matter of the independent claim. Advantageous embodiments are the subject matter of the dependent claims.

The invention is based on the general idea of providing the filter material through which flow can take place with a nanofibre layer on the inflow side. The invention uses the finding here that, for example, in an oil-water dispersion the oil in the form of a dispersion medium passes through the nanofibre layer also undisturbed whereas the water in the form of a finely distributed disperse phase is retained by the nanofibre layer, This is explained by high capillary forces of the nanofibres for water. As a result, the nanofibre layer initially brings about a separation of the water from the oil-water dispersion. The water thus separated can now be transported back or away at or in the nanofibre layer.

This separating effect for water can be intensified by configuring the nanofibre layer of the final separator to be hydrophobic so that the previously coalesced water is separated from the oil-water dispersion.

The hydrophobic configuration of the nanofibre layer can be implemented by a corresponding selection of the nanofibres of the nanofibre layer. Here nanofibres which are hydrophobic can be used. It is conceivable here that the nanofibre layer comprises polyvinylidene fluoride (PVDF) or is produced on PVDF.

Variants in which the nanofibre layer is pre-treated to form the hydrophobic property and/or to improve or increase the hydrophobic property prove to be advantageous. The treatment can take place in this case after producing the nanofibre layer or before producing the nanofibre layer. In the last-mentioned case the nanofibres forming the nanofibre layer are therefore treated accordingly.

It is conceivable here to treat the nanofibre layer chemically.

It is also conceivable to treat the nanofibre layer with electromagnetic beams and/or particle beams. The treatment takes place here in such a manner as to provide the nanofibre layer with the hydrophobic property by activation, or the hydrophobic property of the nanofibre layer is increased. This activation takes place in particular by increasing the tendency of the nanofibre layer to binding for water.

An embodiment proves to be particularly advantageous in which the nanofibre layer is treated with plasma for the hydrophobic configuration. That is, plasma is used to provide the nanofibre layer with the hydrophobic property and/or to increase the hydrophobic property of the nanofibre layer. The plasma treatment of the nanofibre layer in this case allows a particularly effective type of hydrophobic configuration of the nanofibre layer, in particular a particularly effective type of activation of the nanofibre layer.

Preferably the treatment of the nanofibre layer takes place non-destructively in such a manner that the nanofibre layer is not damaged by the treatment or at least to a reduced extent. As a result, the advantageous properties of the nanofibre layer or the relevant nanofibres are at least largely maintained despite the treatment.

The nanofibre layer can in principle be applied directly to the filter body.

An embodiment is advantageous in which the final separator on the raw side has a nanofibre ply or nanofibre layer and a carrier layer required for the nanofibres lies therebehind. The carrier layer can in this case be configured to be less hydrophobic than the nanofibre layer. The carrier layer can here consist of a cellulose material or a fully synthetic fibre material. The nanofibre layer can therefore be applied to the carrier layer, wherein the carrier layer is applied to the filter body. Such a carrier layer is used in particular when the nanofibre layer or the relevant nanofibres do not have sufficient adhesion on the filter body. The carrier layer therefore in particular serves the purpose of enabling a better adhesion of the nanofibre layer on the filter body.

The application of the nanofibre layer to the carrier layer can take place in any manner. It is feasible to dip the carrier layer in a bath with the nanofibres forming the nanofibre layer. It is also feasible that the carrier layer is coated with the nanofibre layer. In this case the carrier layer can be sprayed with nanofibres of the nanofibre layer so that the nanofibre layer is sprayed on the carrier layer.

The treatment of the nanofibre layer with radiation and/or with plasma can be performed here before application of the nanofibre layer to the filter body and/or after application of the nanofibre layer to the filter body. That is in particular that the nanofibre layer applied to the filter body by means of the carrier layer can be treated together with the carrier layer and can then be applied to the filter body. That is also that the nanofibre layer is treated before application to the carrier layer. For this purpose, the nanofibres of the nanofibre layer are treated, in particular with plasma.

Particularly advantageous is an embodiment in which the final separator has a fluting. This fluting helps to guide the water to be separated into a water collecting chamber. Advantageously the fluting has an angle of 0°-90°. In this case, the fluting ideally points in the same direction as a flow of the separated water guided transversely to the final separator or only generates this transverse flow in order to assist the removal of the separated water droplets from the final separator into the water collecting chamber.

Advantageously the fluting runs in the same direction as a flow of the emulsion of water and oil or of water and fuel guided transversely to the final separator or only generates this transverse flow. As a result, in particular an improved removal of the separated water droplets from the final separator into the water collecting chamber is achieved.

The fluting can run at a different angle relative to the flow of the emulsion. It is preferable if the fluting runs transversely to the flow of the emulsion. This results in turbulence at the surface of the final separator and thus improves in particular the coalescence properties of the final separator, which in particular results in an improved filter effect by the final separator.

The fluting in particular additionally has the result that the angle of impact of the water on the final separator is changed. That is to say that as a result of the fluting, the water or water droplets impact on the final separator at an angle other than 90°. In other words: due to the fluting a perpendicular impact of the water or the water droplets on the final separator is avoided or at least reduced. As a result, in particular the coalescing property of the final separator for water and therefore the coalescence of the final separator can be improved.

The fluting therefore in particular improves the transverse flow of the water or produces the transverse flow and results in an improved coalescence of the final separator.

The fluting of the final separator is preferably implemented on the filter body. That is, the filter body has the fluting. Alternatively or additionally the nanofibre layer can have the fluting.

The provision of the final separator with a nanofibre layer on the one hand results in improved separation values and on the other hand also result in improved filter properties of the final separator.

It is furthermore noticeable that the nanofibre layer of the final separator according to the invention is only applied on one side of a filter body of the final separator. Since the filter layer can be configured to be significantly more stable than the nanofibre layer, good carrier properties are obtained for the nanofibre layer, with the result that an increased stability can be achieved for the nanofibre layer. Furthermore, the nanofibre layer can be applied relatively easily to the filter material, which simplifies the manufacture of the filter body for the final separator.

The final separator can have any shape. Preferably the final separator has a rectangular, round, annular, oval or horseshoe-shaped contour. Furthermore, the filter body or the filter material has a porosity. That is, the filter body has cavities such as pores, for example, where the porosity gives the ratio between void fraction and total fraction of the filter body.

Insofar as in the present context, e.g. for the aforesaid pores of the filter material (body pores) or for the pores of the nanofibre layer (nanofibre pores) mentioned further below, it is a question of the pore size or porosity, reference is made to conventional porosimetric methods for determining the porosity of the mean pore size. Preferably however a mercury porosimetry or optical image analysis methods such as, for example TEM, REM or LILI come into consideration.

In addition, according to an advantageous embodiment, the filter body can be additionally configured in such a manner that the porosity on a first side of the filter body is smaller than on a second side of the filter body facing away from the first side. In other words: the void fraction of the filter body on the first side is smaller than on the second side with the result that the first side is more compact and in particular denser and more stable than the second side. Preferably the nanofibre layer is applied to the first side and therefore to the side having the smaller void fraction of the filter body. This has the result on the one hand that the nanofibre layer, in particular compared to an application on the second side, has a better adhesion or is better supported by the filter body. Thus, the nanofibre layer can withstand a stronger flow and therefore impurities or dirt particular having a higher momentum. In addition, the first side having the lower porosity offers better conditions for application of the nanofibre layer so that an improved application of the nanofibre layer and/or the application of such a nanofibre layer with an increased stability is possible on this side.

The lower porosity of the first side compared to the second side of the filter body usually also means that the density of the filter body on the first side is higher than on the second side. This applies particularly when the filter body merely comprises such filter material. The filter body can however also have two or more different filter materials or material compositions. Here the lower porosity of the first side does not necessarily mean that the first side has a higher density than the second side, in particular when the filter body on the first side has a lighter filter material or a filter material having a lower density than on the second side.

The porosity of the filter body means, as mentioned previously, that the filter body or the at least one filter material has voids. These voids can be present in particular in the form of pores which are subsequently designated as body pores. Said body pores can in this case be distributed arbitrarily in the filter body if the first side has a lower porosity than the second side. In addition, the respective body pores can have different sizes and/or shapes. The body pores can in particular be configured as micropores which have dimension in the one to two-digit micron range.

The lower porosity of the filter body on the first side compared to the second side can, for example, be given by the fact that an average size of the body pores or the filter body on the first side is smaller than the average size of the body pores on the second side. That is in particular that the body pores or cavities on the first side are smaller than on the second side. Alternatively or additionally, the number of body pores on the first side can be smaller than on the second side. With uniform average pore size, therefore in particular a body pore density of the filter body on the first side is lower than on the second side.

The lower porosity of the filter body on the first side compared with the second side preferably has the result that the first side is configured to be smoother or flatter than the second side. The smoother or flatter configuration of the first side, which in particular can result in an increased compactness of the first side, provides improved conditions for the application of the nanofibre layer on the first side and/or better supports the nanofibre layer. Such pores or pore bodies can also be formed by interstices in the filter material, when the filter material is a woven fabric or a non-woven.

The final separator according to the invention can be arranged arbitrarily in a relevant final separator device and have a fluid to be cleaned flowing through it. Preferred are those embodiments in which the first side corresponds to the side at which the fluid to be filtered flows in. In other words: the first side corresponds in the state arranged in the final separator device to a raw side of the final separator device at which the fluid to be filtered flows in: Accordingly the second side can correspond to a clean side from which the filtered filter medium flows out. In this case, as a result of the lower porosity of the first side, in particular when the first side has a higher density compared to the second side, it is possible to talk of a surface filter in which the filtering of the fluid takes place predominantly on the first side. That is that the dirt particles or impurities of the fluid to be filtered are filtered or precipitated from the fluid predominantly on the first side or in the region of the first side and settle here. Accordingly the final separator can be cleaned, for example, by back-flushing whereby a fluid flows through it with the opposite direction of flow. This fluid which can be designated as cleaning fluid, therefore flows on the first side from the final separator so that said impurities or dirt particles can be flushed out from the final separator. It is thus possible to increase the lifetime of the final separator or improve a filter effect of the final separator.

Naturally it is also possible to arrange the final separator in the relevant final separator device in such a manner that it functions as a depth filter in which the first side corresponds to the clean side whilst the second side can correspond to the raw side. In this case however, said cleaning by means of back-flushing is made difficult.

The lower porosity of the filter body on the first side compared to the second side can in particular be given by the fact that the porosity along the filter body, in particular along a flow direction of the fluid to be filtered varies. Here in principle all variations within the filter body are conceivable provided that the porosity on the first side is smaller than that on the second side. Thus, the porosity of the filter body can increase in a stepped manner from the first side to the second side at least in some regions. This can be caused in particular by the fact that the filter body is produced in a multilayer or multi-ply manner from two or more filter materials having different porosities. Here it is in particular conceivable that the porosity of the filter body inside the filter body is greater than on the second side. Furthermore, the porosity of the filter body inside the filter body can be lower than on the second side. This step-like variation of the porosity of the filter body is, for example, achieved by a corresponding step-like variation of the average size and/or number of body pores of the filter body from the first side towards the second side. The step-like variation of the porosity can also be caused by adding filter particles into the filter body, where reference is made to carbon particles or active charcoal particles as an example for such filter particles. The step-like variation of the porosity of the filter body can also depend on the manufacture of the filter body. Thus, it is conceivable that the filter body is produced from the same or different filter materials in two or more steps, where the respective transition between the manufacturing steps results in such a step-like variation of the porosity of the filter body.

Alternatively the porosity of the filter body can vary continuously from the first side towards the second side at least in some regions. That is to say that the porosity of the filter body inside the filter body gradually decreases or increases at least in some regions provided that the porosity on the first side is smaller than that on the second side.

Such a continuous variation in the porosity can in particular be related to the manufacture of the filter body, in particular the at least one filter material. Such a manufacture may involve, for example a sieving or scooping of the filter material from the relevant filter base material. In this case the filter material can be scooped or sieved from a filter material liquid containing the filter base material. In other embodiments, the filter material can be manufactured from a filter material gas mixture. This can be accomplished, for example, by depositing the filter material mixture on a foraminous belt. In such a process the filter material liquid or filter material gas mixture flows in one direction in particular due to gravity and/or due to negative pressure or suction, with the result that more filter material can accumulate on the corresponding side than on the opposite side. This has the result that one side has a higher fraction of filter material than the other side, which leads to different porosities inside the filter material. In this case, the porosity usually decreases or increases continuously, wherein the side with the lower porosity corresponds to the first side of the filter body. Such a process can also take place in successive steps, which can result in a previously mentioned step-like variation in the porosity of the filter body. Such a step-like variation in the porosity can also be achieved by the filter body having two or more filter materials having different porosities, where the porosity within the respective filter materials can in particular vary as described above or can be uniform or constant.

In principle, the filter body can be made of any such filter material and/or can have any size and/or shape. Thus, the filter body can be manufactured by folding and/or configured to be asymmetrical. Also the filter body, in particular the filter material can be impregnated and/or have a smooth, lobed, nubbed or fluted structure. If the filter body has a fluted structure, the respective grooves have an arbitrary depth, where embodiments are preferred in which the flute depth is greater than 0.4 mm. Here the sequence of the individual working steps with respect to one another in the shaping of the filter body or the respective filter material is arbitrary.

In preferred embodiments, the filter body is made of a fibrous material. That is to say in particular that the at least one filter material corresponds to the fibrous material. Such a filter body is preferably scooped or sieved from a relevant filter material liquid with said method. Alternatively the filter body can be produced from a filter material which is configured as flat web material and can be pleated. Such a web material is typically available as roll goods for filter production. The fibrous filter material can thus be configured as woven, i.e. as woven fabric or unwoven, i.e. as nonwoven fabric.

Here any fibrous materials can be used, where the filter body or the filter material in particularly preferred embodiment is made of cellulose-containing material or the at least one filter material corresponds to a cellulose-containing material. However, embodiments are also conceivable in which the filter body is made from a fibre mixture of cellulose and/or synthetic fibres. Alternatively or additionally, the filter body or the filter material can also comprise glass fibres or the like or be produced from glass fibres. According to further embodiments, the filter material can be formed from a polymer foam.

In addition to the base material, the previously described filter materials can also have admixtures of other substances. The admixtures can be implemented as fibres or particles, where the admixtures can consist of plastic, glass, graphite, zeolite or mineral substances. In the case of a filter body made from a fibrous material or in the case of a fibrous filter material, the application of the nanofibre layer to the first side in particular has the advantage that a lower number of fibre ends of the filter body compared to the second side are present on this side. These fibre ends in this case in particular comprise free fibre ends which lead to damage of the nanofibre layer by penetrating for example into the nanofibre layer or passing through this. This is preferably counteracted by applying the nanofibre layer on the side of the filter body having the lower porosity, i.e. on the first side and accordingly having the reduced number of fibre ends.

In order to reduce the fibre ends, the filter material, in particular on the first side, can or is preferably pre-treated before application of the nanofibre layer. Such pre-treatment can, for example, include etching of the fibrous filter material. Alternatively or additionally an acid treatment can be carried out. In this case, in addition to reduce the number of fibre ends, a rounding of the fibres and therefore a softening or mitigation or deburring of the corners and/or edges of the fibres can be achieved. A flame treatment or singeing of the fibre ends can contribute to reducing the number of fibre ends. Such a pre-treatment of the fibre ends can be identified on the finished filter body so that not only the method of manufacture but also the final separator produced thereafter is characterized by these measures.

The reduced number of fibre ends can also be achieved by using a different filter material on the first side than on the second side. In this case, the filter material is selected in such a manner that fewer fibre ends are present on the first side.

In particular, it can be provided that on the first side a filter material is used which has softer and more strongly rounded fibres, in particular fibre ends.

A filter material with filament can also be used on the first side. The length of such a filament in particular has the result that the number of fibres and therefore of fibre ends is reduced. In this case, an arbitrary filament can be used. As examples for this reference is made to endless fibres as well as spunbond.

A suitable manufacture of the fibrous filter material can also contribute to reducing the number of free or projecting fibre ends. This includes for example the use of a pressing process in order, for example, to treat a carrier paper of the filter body of the filter material [during] the production of the filter material. In this case therefore, a filter material having at least one smooth side is produced so that the filter material has fewer fibre ends or free fibre ends.

Furthermore, in a winding process during the production of the filter material, in particular the fibres, a separating layer can be used to avoid any damage to the fibres.

In a further variant, the suitable choice of a fibre material helps to reduce the fibre ends. This can be achieved, for example, by selecting a fibre material comprising a comparatively tough resin.

It is furthermore conceivable to apply a fibrous cover layer to the first side on which the nanofibre layer is then applied. The cover layer in particular has the result that the structure of the first side is overall smoother and thus has fewer fibre ends. The cover layer can here for its part be fibrous, although the fibres of the cover layer are not necessarily configured to be functional and for need not contribute to the filter process. Likewise it is conceivable that the cover layer is fibre-free. In this variant the cover layer can for example contain varnish and/or resin and/or an adhesive.

The nanofibre layer generally comprises an arbitrary type of fibres or nanofibres if the respective nanofibres of the nanofibre layer have a suitable dimension and in particular a diameter of up to a few hundred nanometres, preferably less than 500 nm. Furthermore, the nanofibre layer is preferably applied to the entire first side of the filter body; however this need not necessarily be the case. Thus, for example, embodiments are conceivable in which a plurality of nanofibre layers which are separate from one another or remote from one another are applied to the first side of the filter body. Here the respective separate nanofibre layers can be designated as nanofibre particles which can be distributed arbitrarily on the first side, where embodiments are preferred in which said nanofibre particles are homogeneously or uniformly distributed on the first side of the filter body. Alternatively a cohesive nanofibre layer can be provided which does not cover the filter material in special regions. In this case recesses having an arbitrary contour or nanofibre-free regions can be provided on the edges of the filter body. Furthermore the respective nanofibre particles can have an arbitrary size and/or shape. In particular, the respective nanofibre particles have sizes in the two-digit micron range and are for example 50 μm long and/or wide.

The nanofibre layer can be produced in a generally known manner. This includes, for example, electrospinning or melt spinning.

The nanofibre layer or the nanofibre particles can also have a porosity, where the porosity of the nanofibre layer is preferably smaller than the porosity of the filter body and in particular than the porosity of the filter body on the first side. Thus, it is in particular possible to filter smaller impurities or dirt particles from the fluid to be cleaned than with the filter body.

The porosity of the nanofibre layer can be given similarly to the porosity of the filter body by pores of the nanofibre layer, which are hereinafter designated as nanofibre pores. Here embodiments are preferred in which the nanofibre pores of the nanofibre layer are smaller than the body pores of the filter body.

Further important features and advantages of the invention are obtained from the subclaims, from the drawings and from the relevant description of the figures with reference to the drawings.

It is understood that the features mentioned previously and to be explained further hereinafter can be used not only in the respectively given combination but also in other combinations or alone without departing from the scope of the present invention.

Preferred exemplary embodiments of the invention are presented in the drawings and are explained in detail in the following description, where the same reference numbers relate to the same or similar or functionally the same components.

BRIEF DESCRIPTION OF THE DRAWINGS

In the figures, in each case schematically

DETAILED DESCRIPTION

Figure 1:
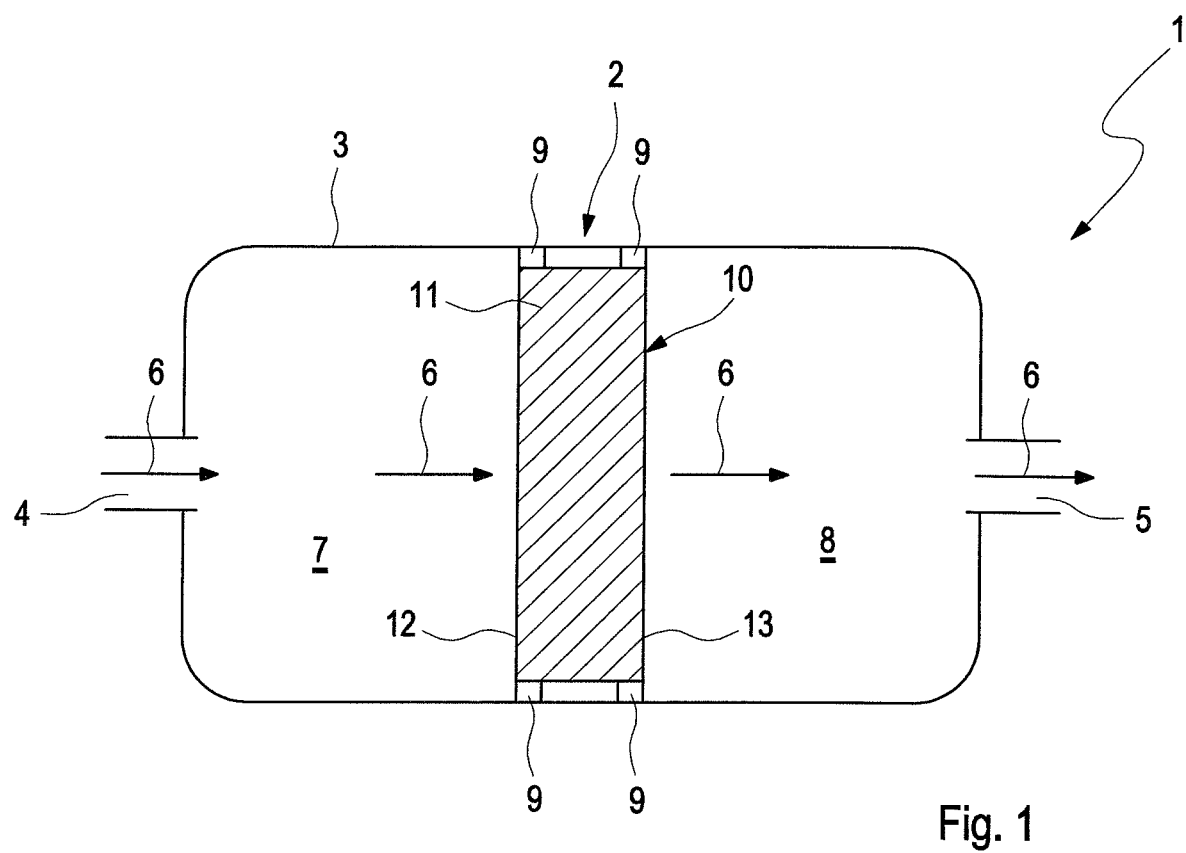
FIG. 1 shows a section through a final separator device with a final separator.

FIG. 1 shows a section through a final separator device 1 which in the example can be configured at the same time as a liquid filter for filtering fuel or oil or another operating liquid, preferably of a motor vehicle. The final separator device 1 is used in this case for separating water which is entrained in the respective operating liquid, i.e. for example in the oil or fuel. For separation of the water or filtering the respective fluid, the final separator device 1 has a final separator 2 which is arranged in a housing 3 of the final separator device 1. The final separator device 1 further has a fluid inlet 4 and a fluid outlet 5 which are formed on opposite sides of the housing 3. The liquid to be filtered or dewatered flows, as indicated by the arrows 6, through the fluid inlet 4 into the housing 3 and impinges upon the final separator 2 where it is filtered and freed from water components and then passes via the fluid outlet 5 out from the final separator device 1. Thus, the final separator device 1 or the housing 3 is divided by means of the final separator 2 into two regions: the region adjacent to the fluid outlet 4 forms a raw side 7 whilst the region adjacent to the fluid outlet 5 forms the clean side 8. The final separator 2 is held or fixed in the housing 3 with the aid of retaining means 9, wherein the retaining means 9 are configured to be fluid-tight so that the fluid to be purified can only pass through the final separator 2 from the raw side 7 to the clean side 8. The final separator 2 comprises a filter body 10 which is formed from at least one filter material 11 or comprises this filter material 11. In addition, a first side 12 of the final separator 2 or the filter body 3 is disposed on the raw side 7 or corresponds to this, whereas a second side 13 facing away from the first side 13 is disposed on the clean side 8 or corresponds to this. That is that the fluid to be filtered flows into the final separator 2 or into the filter body 10 on the first side 12 and flows out from the final separator 2 or the filter body 10 on the second side 13, wherein the first side 12 and the second side 13 of the filter body 10 correspond to the first side 12 or the second side 13 of the corresponding filter material 11.

Figure 2:
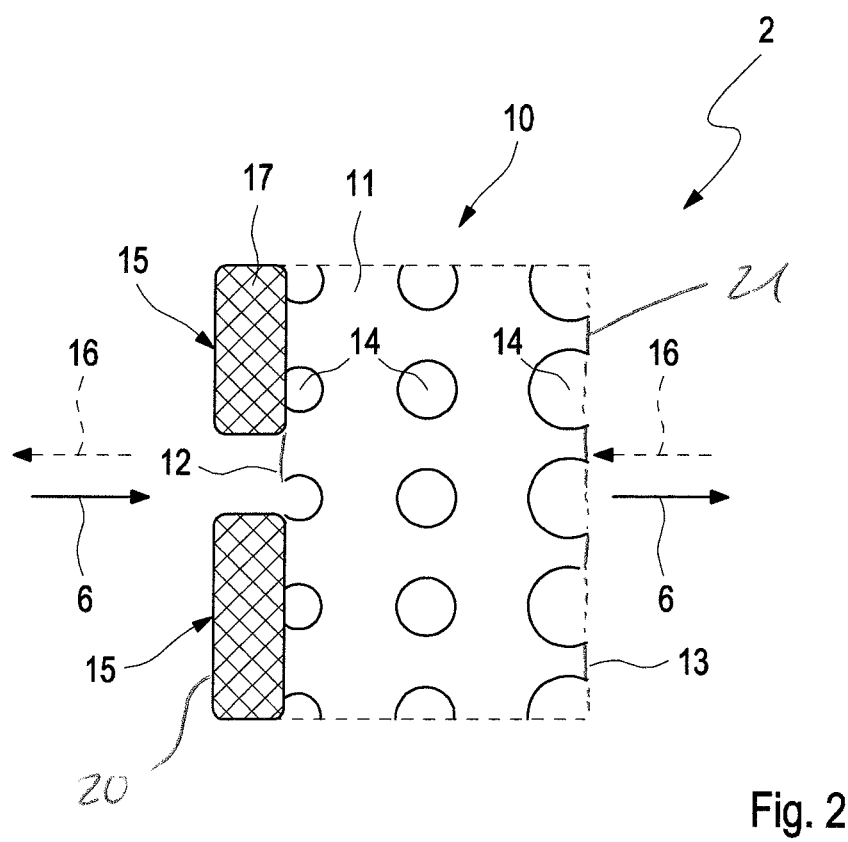
FIGS. 2-5 each show a section through a final separator in various embodiments.
Figure 3:
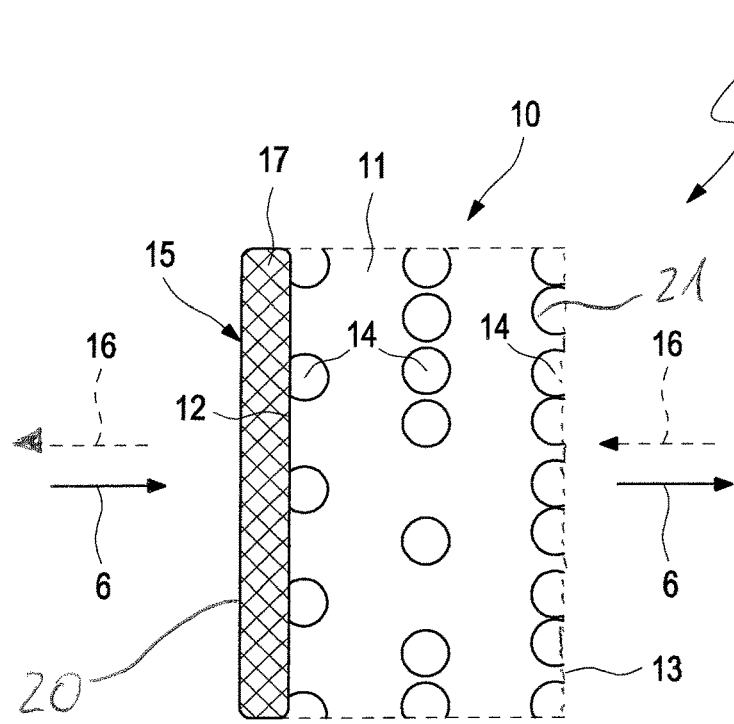
Figure 4:
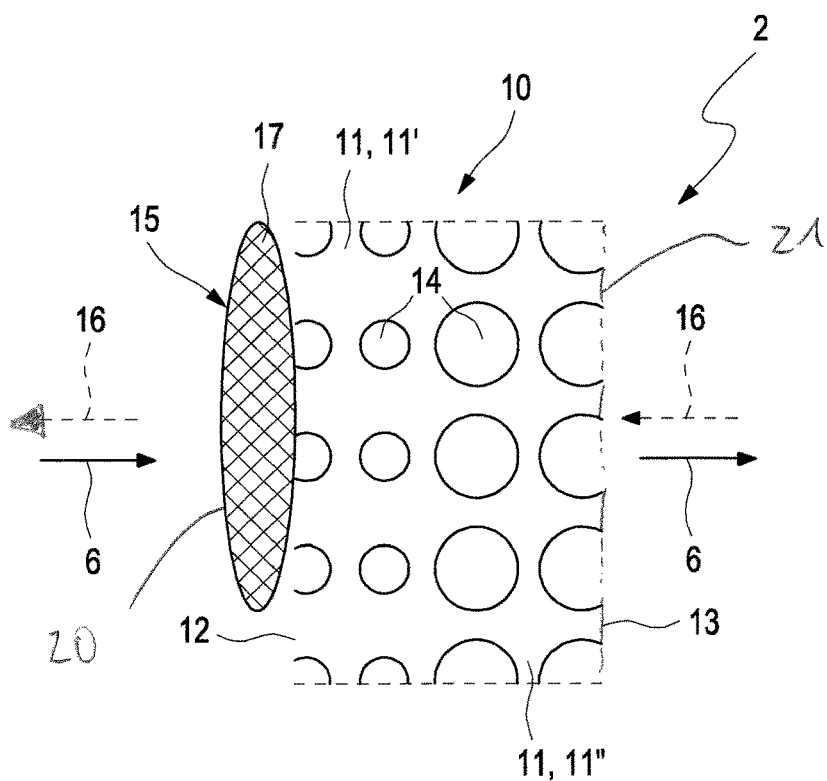

FIGS. 2 to 4 each show a section through such a final separator 2, wherein different embodiments of the final separator 2 are shown in the respective figures. In this case, in these figures the first side 12 and the second side 13 are shown in a section. Here it should be observed that the filter body 10 or the filter material 11 comprises voids or pores which are hereinafter designated as body pores 14, wherein purely exemplary circular body pores 14 are shown in the figures. The filter body 10 or the filter material 11 therefore has a porosity which gives the ratio of the void fraction or body pore fraction to the total fraction of the filter body 10 or the filter material 11. For this purpose, it should be observed that the porosity on the first side 12 is smaller than that on the second side 13.

In the embodiment shown in FIG. 2 the lower porosity on the first side 12 compared to the second side 13 is achieved whereby the size of the body pores 14 for the same number increases continuously or in steps from the first side 12 to the second side 13, which leads to a continuous or stepped increase in the porosity from the first side 12 towards the second side 13.

In the embodiment shown in FIG. 3, the respective body pores 14 are configured to be the same size whereas the number of body pores 14 increases continuously or in steps from the first side 12 towards the second side 13. Thus, the porosity therefore increases continuously or in steps from the first side 12 to the second side 13.

In the embodiment shown in FIG. 4, the filter body 10 comprises two different-sized types of body pores 14. In this case, the smaller body pores 14 are disposed in the region of the first side 12 whereas the larger body pores 14 are disposed in the region of the second side 13. This can be caused by the fact, for example, that the filter body 10 in the region of the first side 12 is made from a different filter material 11' compared to that in the region of the second side 13 which is made from another filter material 11". Thus, the filter material 11' present in the region of the first side 12 has smaller body pores 14 whereas the other filter material 11" which is disposed in the region of the second side 13 has larger body pores 14. Thus, the porosity here also on the first side 12 is lower than that on the second side 13.

Figure 5:
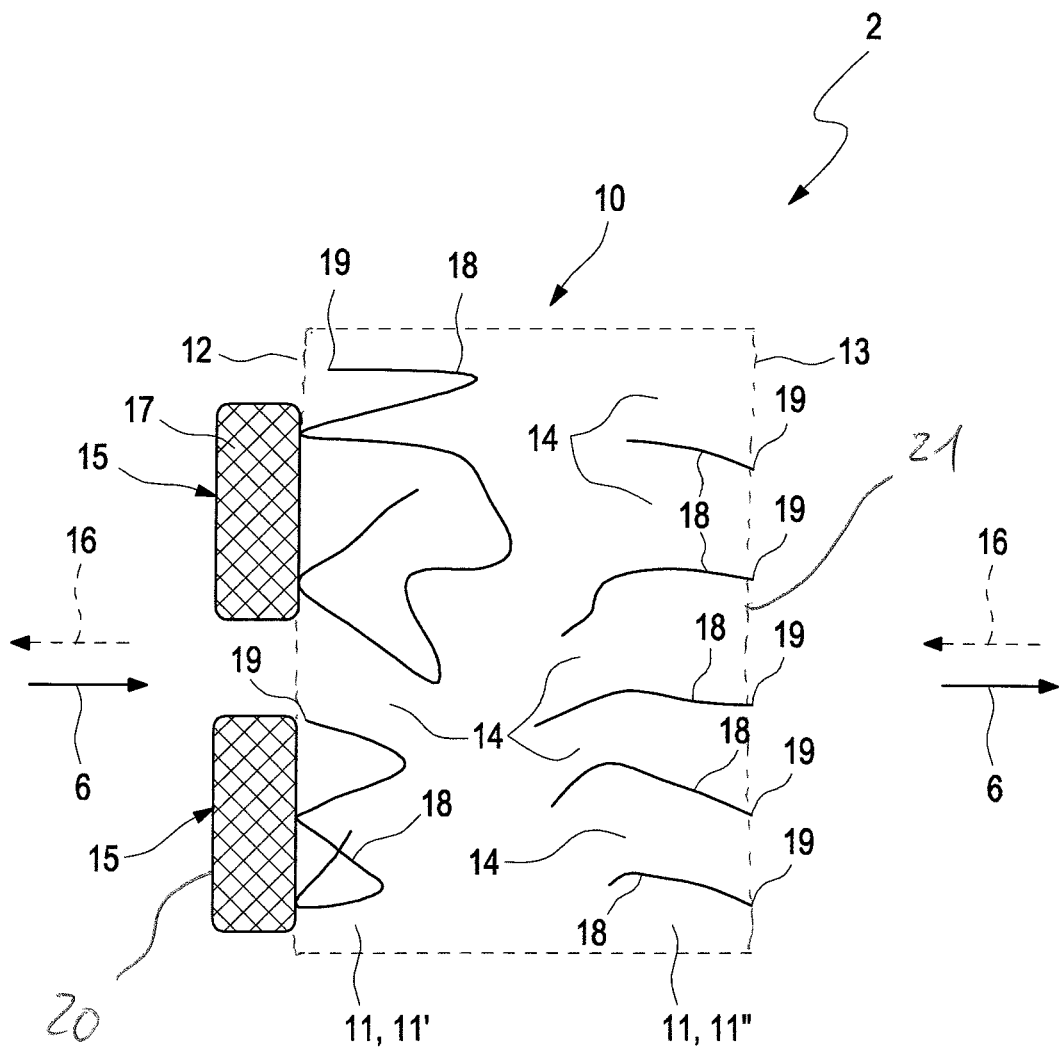

FIG. 5 shows another exemplary embodiment in which different filter materials 11', 11" are used on the first side 12 and on the second side 13. Both filter materials 11', 11" here comprise fibres 18 wherein the fibre material 11' on the first side 12 has fewer free ends 19 that the fibre material 11" on the second side 13. This also has the result that the porosity or the number of body pores 14 on the first side 12 is smaller than on the second side 13.

The lower porosity of the filter body 10 on the first side 12 compared to the second side 13 overall has the result that the first side 12 is configured to be smoother or flatter or more stable than the second side 13. In other words, the surface of the first side 12 is smoother or flatter and more stable than the surface of the second side 13.

Furthermore, a nanofibre layer 15 is applied to the first side 12, at least in some regions. This has the advantage that the nanofibre layer 15 on the first side 12, which has the lower porosity, finds a smoother or flatter surface so that it can be applied more easily to the first side 12. In addition, the nanofibre layer 15 is better supported on the first side 12 so that it can withstand greater loads. That is, the nanofibre layer 15 can withstand higher flow rates of the fluid to be filtered. Thus, the nanofibre layer 15 can also withstand higher mechanical loads so that the impurities or dirt particles of the fluid to be cleaned can impinge upon the nanofibre layer 15 with higher momenta without damaging or destroying this.

The nanofibre layer 15 and the filter material 11 are used for dewatering and here at the same time for filtering the fluid to be cleaned. In the arrangement of the filter body 10 of the final separator device 1 shown, as a result of the arrangement of the nanofibre layer 15 or the lower porosity of the first side 12, the dewatering or filtering of the fluid takes place predominantly in the region of the first side 12 so that the dirt particles of the fluid or the impurities of fluid are separated predominantly in the region of the first side 12. In the arrangement of the filter body 10 shown, the final separator 2 can therefore also be designated as surface filter. In this case, it is possible to clean the final separator 2 by cleaning the final separator 2 with a cleaning fluid which flows through the final separator 2 in a direction 16 opposite to the flow direction 6. It is thus possible to flush the first particles or impurities of the fluid to be cleaned, which are separated in the region of the first side 12, out from the final separator 2. This increases the lifetime of the final separator 2 and/or improves the filter effect or efficiency of the final separator 2. At the same time, the separating effect can thereby also be permanently maintained or improved.

The nanofibre layer 15 comprises nanofibres which usually have diameters of several hundred nanometres or less. Here the first side 12 is covered with the nanofibre layer 15 at least in some regions. The embodiment shown in FIG. 3 shows a variant in which such a nanofibre layer 15 is applied in the section shown which has a coverage of filter material 11 over the entire surface. In the embodiments shown in FIGS. 2 and 5, on the other hand two such nanofibre layers 15 are shown which are applied to the first side in a spaced-apart manner and cover the surface of the filter body 10 or the filter material 11 in a segment manner. FIG. 4 also shows such a nanofibre layer 15 which only covers the surface of the filter body 10 in a partial region, wherein the edge region of the filter body 10 is not covered by the nanofibre layer 15.

The respective nanofibre layer 15 also has a porosity which is caused by the pores 17 arranged in the nanofibre layer 15 which are hereinafter designated as nanofibre pores 17. Here in the embodiments shown purely as an example, the respective nanofibre layer 15 has a constant porosity, in which case nanofibre layers 15 having varying porosities can also be used. It should further be observed that the nanofibre pores 17 of the respective nanofibre layer 15 are smaller than the body pores 14 of the filter body 10. Thus, the respective nanofibres layer 15 have a lower porosity than the relevant filter bodies 10. Thus, it is in particular possible to separate smaller dirt particles from the fluid to be filtered with the aid of the nanofibre layer 15 than with the filter body 10.

The respective nanofibre layer 15 can be made of any material. The respective filter body 10 can also be made of any filter material 11 or any different filter materials 11. The filter body 10 can in particular be made of a fibrous filter material 11. Examples for this are cellulose-containing filter materials 11 and/or a fibre mixture of cellulose and synthetic fibres 18 and/or glass fibres.

According to the invention, one of filter material 11 and nanofibre layer 15 is now configured to be hydrophobic whereas the respectively other is configured to be less hydrophobic. Preferably the first side 12, which in the state of the final separator 2 arranged in the final separator device 1 corresponds to the raw side 7 at which the fluid to be filtered flows in, is configured to be hydrophobic. In the examples shown, the nanofibre layer 15, which in the installed state forms the raw side 7 of the filter body 10, is therefore configured to be hydrophobic. The filter material 11 is configured to be less hydrophobic.

The hydrophobic configuration of the nanofibre layer 15 can be implemented by a corresponding chemical pre-treatment of the nanofibres or the nanofibre layer 15 or can be produced according to FIGS. 2 to 5 by means of a hydrophobic coating 20 of the nanofibre layer 15. The hydrophobic configuration of the nanofibre layer 15 can alternatively or additionally be implemented by a plasma treatment of the nanofibre layer 15. The hydrophobic configuration of the filter material 11 can be implemented by a corresponding chemical pre-treatment of the filter material 11 or the fibres 28 from which the filter material 11 is made or according to FIGS. 2 to 5 can be produced by means of a hydrophobic coating 21 of the filter material 11.

The invention claimed is:

1. A water separator for a separator device, comprising;
a filter body for filtering a liquid, the filter body including at least one filter material;
the filter body having a first side and a second side facing away from the first side;
a nanofibre layer disposed on the first side in at least one region;
wherein the nanofibre layer is configured hydrophobic via a hydrophobic activating treatment;
a porosity of the filter body on the first side is smaller than on the second side;
wherein the porosity of the filter body increases from the first side towards the second side in a stepped transition at least in one region; and
wherein the filter body includes a plurality of filter particles disposed at least in the one region providing the stepped transition.

2. The separator according to claim 1, wherein the filter body has an average size of body pores on the first side that is smaller than the average size of the body pores on the second side.

3. The separator according to claim 1, wherein the at least one filter material includes a fibrous filter material.

4. The separator according to claim 1, wherein the at least one filter material includes a cellulose-containing filter material.

5. The separator according to claim 1, wherein the nanofibre layer has a lower porosity than that of the first side of the filter body.

6. The separator according to claim 5, wherein the nanofibre layer has pores that are smaller than pores of the filter body.

7. The separator according to claim 1, wherein the at least one filter material includes a plurality of fibres, and wherein a number of fibre ends of the plurality of fibres disposed on the first side is smaller than on the second side.

8. The separator according to claim 7, wherein the first side is composed of a different filter material than the second side.

9. The separator according to claim 1, wherein the at least one filter material on the first side includes a filament material.

10. The separator according to claim 1, wherein the nanofibre layer is a plasma-activated hydrophobic nanofibre layer.

11. The separator according to claim 1, further comprising a fluting.

12. A separator device for separating water from a liquid, comprising:
a housing including a fluid inlet and a fluid outlet; and
a final separator arranged in the housing and separating a raw side of the housing connected to the fluid inlet from a clean side of the housing connected to the fluid outlet, the final separator including:
a filter body for filtering the liquid, the filter body including at least one filter material, the filter body having a first side and a second side facing away from the first side;
a nanofibre layer disposed on the first side in at least one region;
wherein the nanofibre layer is configured hydrophobic via a hydrophobic activating treatment;

wherein the filter body has a porosity on the first side that is smaller than on the second side;

wherein the porosity of the filter body increases from the first side towards the second side in a stepped transition at least in one region; and wherein the filter body includes a plurality of filter particles disposed at least in the one region providing the stepped transition.

13. A method for producing a final separator for a final separator device, comprising:

providing a filter body for filtering a liquid, the filter body including at least one filter material, the filter body having a first side and a second side facing away from the first side;

applying a nanofibre layer of nanofibres to the first side at least in one region;

treating the nanofibre layer via a hydrophobic activating treatment to produce a hydrophobic property;

wherein providing the filter body includes forming a lower porosity on the first side than on the second side such that a porosity of the filter body increases from the first side towards the second side in a stepped transition at least in one region; and wherein providing the filter body includes disposing a plurality of filter particles in the filter body at least in the one region to provide the stepped transition.

14. The separator according to claim 1, wherein the at least one filter material of the filter body includes a plurality of fibers each terminating at a free end, and wherein the free end of the plurality of fibers on the first side are softer and more rounded than the free end of the plurality of fibers on the second side.

15. The separator according to claim 1, wherein the first side has a smoother surface than the second side.

16. The separator according to claim 1, further comprising a cover layer disposed between the nanofibre layer and the first side.

17. The separator according to claim 1, wherein the plurality of filter particles include at least one of carbon particles and activated charcoal particles.

18. The separator according to claim 11, wherein the fluting is arranged on the filter body and extends transversely to a liquid through-flow direction.

* * * * *